United States Patent
Agarwal et al.

(10) Patent No.: US 9,628,576 B1
(45) Date of Patent: Apr. 18, 2017

(54) APPLICATION AND SHARER SPECIFIC RECIPIENT SUGGESTIONS

(71) Applicant: Google Inc., Mountain View, CA (US)

(72) Inventors: Ayush Agarwal, Mountain View, CA (US); Francis Ma, Mountain View, CA (US); Seth Sternberg, Mountain View, CA (US)

(73) Assignee: Google Inc., Mountain View, CA (US)

( * ) Notice: Subject to any disclaimer, the term of this patent is extended or adjusted under 35 U.S.C. 154(b) by 462 days.

(21) Appl. No.: 14/173,783

(22) Filed: Feb. 5, 2014

Related U.S. Application Data

(60) Provisional application No. 61/911,959, filed on Dec. 4, 2013.

(51) Int. Cl.
G06F 15/16 (2006.01)
H04L 29/08 (2006.01)
G06Q 10/10 (2012.01)

(52) U.S. Cl.
CPC ............ H04L 67/22 (2013.01); G06Q 10/10 (2013.01); *H04L 67/20* (2013.01); *H04L 67/30* (2013.01)

(58) Field of Classification Search
CPC .................................................. G06Q 10/10
See application file for complete search history.

(56) References Cited

U.S. PATENT DOCUMENTS

| | | | | |
|---|---|---|---|---|
| 7,260,837 B2 * | 8/2007 | Abraham | ......... | G06F 17/30867 705/76 |
| 7,603,382 B2 * | 10/2009 | Halt, Jr. | | |
| 7,716,140 B1 * | 5/2010 | Nielsen | ............... | G06F 21/6245 705/319 |
| 8,554,875 B1 * | 10/2013 | Alfaro | ..................... | H04L 67/18 709/218 |
| 8,584,051 B1 * | 11/2013 | Alfaro | ....................... | G06F 3/00 715/752 |
| 8,589,808 B1 * | 11/2013 | Alfaro | ....................... | G06F 3/00 709/204 |
| 8,631,119 B2 | 1/2014 | Malkin et al. | | |
| 8,676,937 B2 * | 3/2014 | Rapaport | ................ | H04L 51/32 709/219 |
| 8,782,022 B2 * | 7/2014 | Jana | ................... | G06F 17/30365 707/609 |
| 8,812,419 B1 * | 8/2014 | Teller | ..................... | G06Q 10/10 706/46 |
| 8,930,820 B1 * | 1/2015 | Elwell | ..................... | G06F 17/60 705/319 |

(Continued)

*Primary Examiner* — Krista Zele
*Assistant Examiner* — Anthony Fabbri
(74) *Attorney, Agent, or Firm* — Patent Law Works LLP

(57) ABSTRACT

A system and method for suggesting to a first user about a second user who is available to have social interactions with the first user at a specific time based at least in part on user context for activities associated with habits of users. A habit engine determines habits of the first user and the second user to identify when each user is available for the social interactions. A context engine determines user context for a group of activities performed by the first user and the second user. A suggestion module identifies a time when the first user and the second user are available for the social interactions associated with a first activity having a matching context. The suggestion module provides a first suggestion that the first user join the second user in the first activity in a social network.

20 Claims, 8 Drawing Sheets

(56) References Cited

U.S. PATENT DOCUMENTS

| | | | |
|---|---|---|---|
| 9,288,275 B2* | 3/2016 | Jain | H04L 67/22 |
| 2005/0114759 A1* | 5/2005 | Williams | G06Q 10/10 |
| | | | 715/221 |
| 2007/0255807 A1* | 11/2007 | Hayashi | H04L 12/58 |
| | | | 709/219 |
| 2007/0255831 A1* | 11/2007 | Hayashi | G06F 17/30867 |
| | | | 709/226 |
| 2008/0235349 A1* | 9/2008 | Caspi | G06Q 10/10 |
| | | | 709/218 |
| 2009/0164559 A1* | 6/2009 | Johnson | H04L 12/1822 |
| | | | 709/203 |
| 2009/0228486 A1* | 9/2009 | Kuehr-McLaren | G06F 17/3089 |
| 2010/0042684 A1* | 2/2010 | Broms | G06Q 10/10 |
| | | | 709/204 |
| 2010/0083139 A1* | 4/2010 | Dawson | A63F 13/12 |
| | | | 715/757 |
| 2010/0161720 A1* | 6/2010 | Colligan | G06Q 30/02 |
| | | | 709/203 |
| 2010/0251177 A1* | 9/2010 | Geppert | G06F 3/04817 |
| | | | 715/821 |
| 2010/0281104 A1* | 11/2010 | Tomkins | G06Q 10/10 |
| | | | 709/203 |
| 2010/0293105 A1* | 11/2010 | Blinn | G06Q 10/10 |
| | | | 705/319 |
| 2011/0010305 A1* | 1/2011 | Aleong | G06Q 10/10 |
| | | | 705/319 |
| 2011/0047013 A1* | 2/2011 | McKenzie, III | G06Q 10/10 |
| | | | 705/14.4 |
| 2011/0138028 A1* | 6/2011 | Katz | G06Q 10/10 |
| | | | 709/223 |
| 2011/0161202 A1* | 6/2011 | Arunachalan | G06Q 20/04 |
| | | | 705/27.1 |
| 2011/0161791 A1* | 6/2011 | Travis | G06Q 10/10 |
| | | | 715/205 |
| 2011/0238815 A1* | 9/2011 | Malkin | H04L 12/5815 |
| | | | 709/224 |
| 2011/0289433 A1* | 11/2011 | Whalin | G06F 17/30964 |
| | | | 715/753 |
| 2011/0314115 A1* | 12/2011 | Nagaraj | G06Q 10/1095 |
| | | | 709/206 |
| 2012/0158843 A1* | 6/2012 | Angani | G06Q 50/01 |
| | | | 709/204 |
| 2012/0179981 A1* | 7/2012 | Whalin | G06Q 10/10 |
| | | | 715/753 |
| 2012/0278262 A1* | 11/2012 | Morgenstern | G06Q 10/10 |
| | | | 706/12 |
| 2013/0006879 A1 | 1/2013 | Ramanathan et al. | |
| 2013/0073636 A1* | 3/2013 | Zhu | H04L 51/043 |
| | | | 709/206 |
| 2013/0097246 A1* | 4/2013 | Zifroni | G06Q 50/01 |
| | | | 709/204 |
| 2013/0184031 A1* | 7/2013 | Pollington | H04W 88/02 |
| | | | 455/556.1 |
| 2013/0325755 A1* | 12/2013 | Arquette | H04L 51/32 |
| | | | 706/12 |
| 2014/0143347 A1* | 5/2014 | Murarka | H04L 51/32 |
| | | | 709/206 |
| 2014/0214824 A1* | 7/2014 | Mai | G06F 17/30657 |
| | | | 707/731 |
| 2014/0344358 A1* | 11/2014 | Liu | H04L 67/22 |
| | | | 709/204 |
| 2015/0033305 A1 | 1/2015 | Shear et al. | |
| 2015/0046542 A1* | 2/2015 | Yamamoto | H04L 12/1822 |
| | | | 709/206 |
| 2016/0007912 A1* | 1/2016 | Hu | A61B 5/002 |
| | | | 600/595 |

\* cited by examiner

APPLICATION AND SHARER SPECIFIC RECIPIENT SUGGESTIONS

CROSS REFERENCE TO RELATED APPLICATIONS

The present application claims priority, under 35 U.S.C. §119, of U.S. Provisional Patent Application No. 61/911,959, filed Dec. 4, 2013, and entitled "Application and Sharer Specific Recipient Suggestions," which is incorporated by reference in its entirety.

BACKGROUND

The specification relates to generating a suggestion. In particular, the specification relates to suggesting that a first user join a second user in a social interaction in a social network based at least in part on a context for activities associated with habits of users at a specific time.

Technology makes social interactions easy and fast. For example, a person can find people who like taking pictures and share pictures with them on a social network. A student can find people who study the same class and invite people to join a study group on the social network. However, these social interactions based on common interests can easily fail since the recipients of the invitations can be too busy to respond or the invitation can be for an activity that is not attractive enough for the recipient to accept the invitation.

SUMMARY

According to one innovative aspect of the subject matter described in this disclosure, a habit engine, with one or more processors, determines habits of a first user and a second user to identify when each user is available for social interactions. A context engine, with the one or more processors, determines user context for a group of activities performed by the first user and the second user. A suggestion module, with the one or more processors, identifies a time when the first user and the second user are available for the social interactions associated with a first activity having a matching context. The suggestion module, with the one or more processors, provides a first suggestion that the first user join the second user in the first activity in a social network.

In general, another innovative aspect of the subject matter described in this disclosure may be embodied in methods that include determining habits of a first user and a second user to identify when each user is available for social interactions, determining user context for a group of activities performed by the first user and the second user, identifying a time when the first user and the second user are available for the social interactions associated with a first activity having a matching context and providing a first suggestion that the first user join the second user in the first activity in a social network. Other aspects include corresponding methods, systems, apparatus, and computer program products.

These and other implementations may each optionally include one or more of the following features. For instance, operations further include using the habits to determine segments of time when the first user is active on the social network with regarding to the context. Operations further include identifying a group created by the first user in the social network that is associated with the matching context and providing a second suggestion that the first user add the second user to the group. Operations further include identifying a group created on a third-party website with the matching context and providing a second suggestion that the first user join the group. Operations further include providing a second suggestion that the first user add the second user to a group and responsive to the first user ignoring the first or second suggestion, modifying a threshold probability.

For instance, the features further include determining the habits by determining when the first user accesses applications for personal use and when the first user accesses the applications for business use. The features further include identifying the time when the first user and the second user are available by determining that a likelihood that the first user and the second user in the social network are available at the time for the social interactions having the matching context exceeds the threshold probability.

The specification advantageously describes a system and method for determining a recipient with whom a user can have social interactions based on multiple parameters such as context associated with the social interactions, a time for having social interactions. The specification determines a right recipient by maximizing a probability that the recipient will respond the social interactions initiated by a user.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

The connection application for suggesting connections between users based on habits and context is described. Habits are used to characterize when users are available for social interactions. For example, habits are used to identify when the user is at work, but not working, waiting around at a bus stop, bored while watching television at night, etc. The habits can be categorized based on the user's activities on a social network, browsing history, activities on third-party websites, etc. Context is based on the type of social interaction to which the user is open. For example, some users enjoy playing games, looking at photography, commenting on posts, sharing news articles, etc.

The connection application pairs at least two users together based on sharing similar habits and context. For example, a first user may be open to interacting with other users about photography around the same time that a second user typically uploads his weekly photos from photography sessions. The connection application suggests that the first user join the second user in the activity, for example, by posting one of the photos to the first user's stream of content. In some embodiments, where the first user already has a group that encompasses the context, for example, a photography circle, the connection application can suggest that the first user add the second user to that group.

Figure 1:
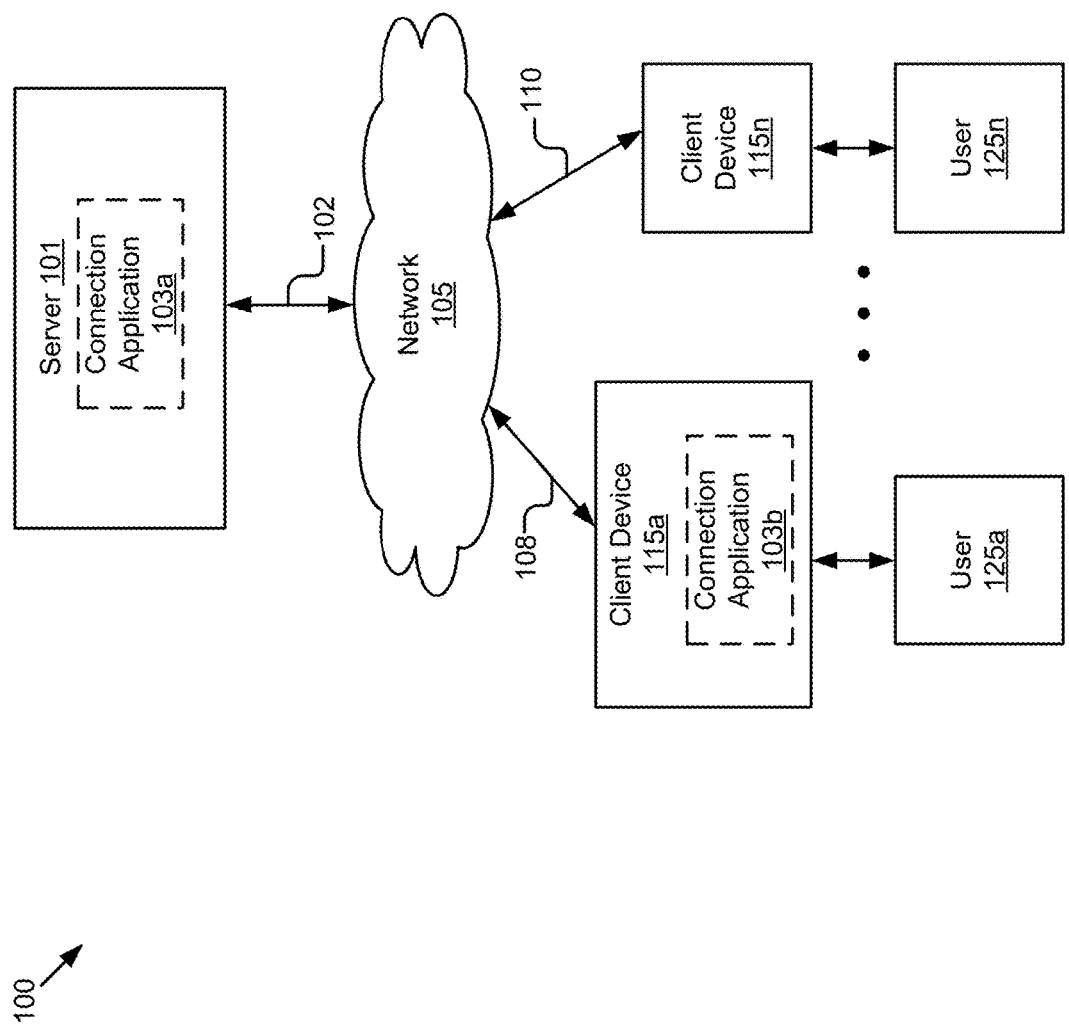
FIG. 1 is a block diagram illustrating an example system for suggesting a first user about a second user with whom the first user should trigger social interactions based at least in part on user context for activities associated with habits of users in a specific time.

FIG. 1 illustrates a block diagram of a system 100 for suggesting that a first user join a second user in a social interaction in a social network based at least in part on context for activities associated with habits of users at a specific time. The illustrated system 100 includes client devices 115a, 115n that are accessed by users 125a, 125n and a server 101. In the illustrated example, these entities are communicatively coupled via a network 105. In FIG. 1 and the remaining figures, a letter after a reference number, for example, "115a" is a reference to the element having that particular reference number. A reference number in the text without a following letter, for example, "115" is a general reference to different embodiments of the element bearing that reference number. Although only two devices are illustrated, persons of ordinary skill in the art will recognize that arbitrary number of client devices 115n is available to arbitrary number of users 125n.

In some embodiments, the connection application 103a is operable on the server 101. The server 101 can be a computing device that includes a processor, a memory and network communication capabilities. The server 101 is coupled to the network 105 via signal line 102. The server 101 sends and receives data to and from the client device 115 of the system 100 via the network 105. Although only one server 101 is shown, persons of ordinary skill in the art will recognize that multiple servers can be present.

In other embodiments, the connection application 103b is stored on a client device 115a, which is connected to the network 105 via signal line 108. In one example, the connection application 103b is a thin-client application that includes part of the connection application 103 on the client device 115a and part of the connection application 103 on the server 101 to suggest a first user about a second user with whom the first user should trigger social interactions. The user 125a interacts with the client device 115a. The client device 115a, 115n can be a computing device, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some other embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client device 115 and the server 101, in practice one or more networks 105 can be connected to these entities.

The connection application 103 suggests that a first user join a second user in a social interaction in a social network based on a context and a time. For example, the connection application 103 receives data describing that Molly wants to invite some people to challenge her in a game. The connection application 103 determines that Dave is also playing the same game and suggests Dave to Molly such that they can play the game together.

In some embodiments, the connection application 103 suggests a second user to a first user based on identifying a time when the first and second users are available for social connections. Continuing with the above example, the connection application 103 determines that both Dave and Richard like the same game based on their activities in a social network, for example, based on the activity data describing that Dave frequently accesses a mobile game application of the game and Richard always comments and re-shares posts about the game in the social network. Furthermore, the connection application 103 determines that there is an overlapping time when Dave and Molly play the game, and that Molly and Richard play the game at different times during the day (e.g., Molly plays the game at noon while Richard plays the game in the evenings). Based on determining whether there is a time both users are available to play the game, the connection application 103 suggests Dave rather than Richard to Molly.

In some embodiments, when providing a suggestion to the first user, the connection application 103 uses a likelihood to determine which recipient will most likely interact with the first user and generates a suggestion for the first user to include this recipient (e.g., the second user). This way, the connection application 103 maximizes the probability that the first and second users interact with each other. For example, the connection application 103 suggests Tom share a photo with Mary because based on a context determination Mary is most likely to accept Tom's invitation for sharing the photo and Mary is most likely to comment the photo, re-share the photo and interact with Tom about the photo in other ways.

In some embodiments, the connection application 103 determines, from contacts of a first user in a social network, a second user and suggests the second user to the first user. For example, Tom and Jerry are acquaintances in a social network. In addition to being acquaintances, the connection application 103 determines that both Tom and Jerry study chemistry for class after 8:00 pm Thursday, and suggests that Tom add Jerry to a "chemistry study group" created by Tom in the social network. In other embodiments, the connection application 103 determines, from contacts of a first user outside a social network, a second user and suggests the second user to the first user. Continuing with the above example, Tom does not connect with Andrew in the social network. However, the connection application 103 determines that Tom and Andrew talked about chemistry homework a few times in emails outside the social network, and suggests that Tom join Andrew in a chemistry studying activity by suggesting a post created by Andrew to Tom.

Figure 2:
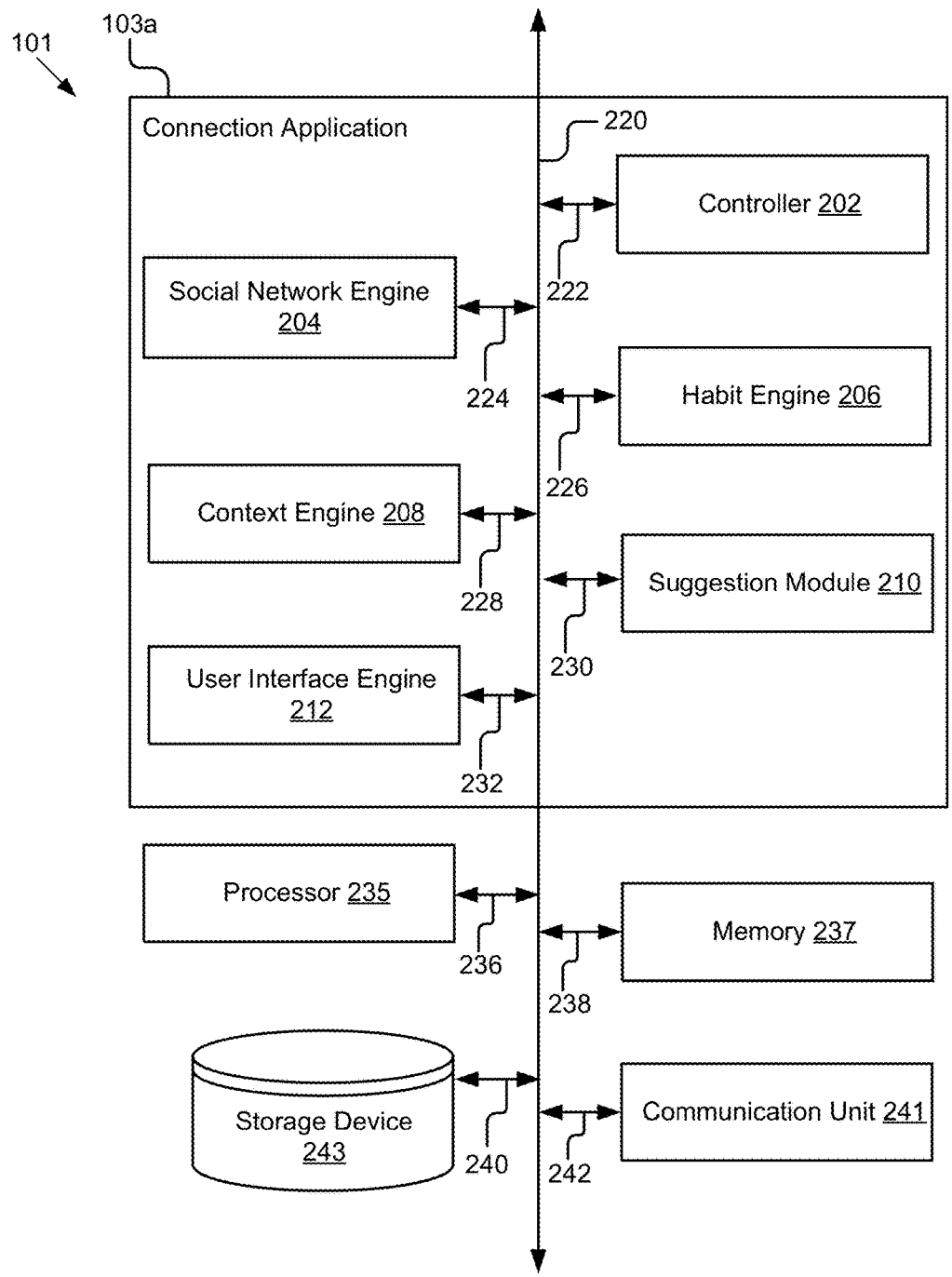
FIG. 2 is a block diagram illustrating one embodiment of a connection application.

Referring now to FIG. 2, an example of the connection application 103a is shown in more detail. FIG. 2 is a block diagram of a server 101 that includes a processor 235, memory 237, a communication unit 241 and a storage device 243 according to some implementations. The components of the server 101 are communicatively coupled by a bus 220.

The processor 235 includes some or all of an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor, multiple processors are included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components via signal line 238. The instructions and/or data may include code for performing any and/or all of the techniques described herein. The memory 237 may be a dynamic random access memory (DRAM) device, a static random access memory (SRAM) device, flash memory or some other memory device known in the art. In some embodiments, the memory 237 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 241 transmits and receives data to and from at least one of the client device 115 and the server 101 where the connection application 103 is stored. The communication unit 241 is coupled to the bus 220 via signal line 242. The communication unit 241 receives data describing a user's activity from the client device 115 and transmits the data to the connection application 103. The communication unit 241 also transmits data including a suggestion to the client device 115. In some embodiments, the communication unit 241 includes a port for direct physical connection to the client device 115 or to another communication channel. For example, the communication unit 241 includes an RJ45 port or similar port for wired communication with the client device 115. In other embodiments, the communication unit 241 includes a wireless transceiver (not shown) for exchanging data with the client device 115 or any other communication channel using one or more wireless communication methods, such as IEEE 802.11, IEEE 802.16, Bluetooth® or another suitable wireless communication method.

In some other embodiments, the communication unit 241 includes a cellular communications transceiver for sending and receiving data over a cellular communications network such as via short messaging service (SMS), multimedia messaging service (MMS), hypertext transfer protocol (HTTP), direct data connection, wireless application protocol (WAP), e-mail or another suitable type of electronic communication. In still another embodiment, the communication unit 241 includes a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The storage device 243 is a non-transitory memory that stores data for providing the functionality described herein. The storage device 243 is coupled to the bus 220 via signal line 240. The storage device 243 may be a dynamic random access memory (DRAM) device, a static random access memory (SRAM) device, flash memory or some other memory devices. In some embodiments, the storage device 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the storage device 243 stores activity data associated with a user, habits of the user determined based on the activity data and user context for a group of activities. In other embodiments, the data storage 243 also stores suggestions sent to a client device.

In some embodiments, the connection application 103a comprises a controller 202, a social network engine 204, a habit engine 206, a context engine 208, a suggestion engine 210 and a user interface engine 212.

The controller 202 can be software including routines for receiving data and transmitting the data to an appropriate component. In some embodiments, the controller 202 can be a set of instructions executable by the processor 235 to provide the functionality described below for receiving and transmitting the data. In other embodiments, the controller 202 can be stored in the memory 237 of the server 101 and can be accessible and executable by the processor 235. In some embodiments, the controller 202 can be adapted for cooperation and communication with the processor 235 and other components of the server 101 via signal line 222.

In some embodiments, the controller 202 receives data via the communication unit 241 and transmits the data to the appropriate module or engine of the connection application 103. For example, the controller 202 receives data describing a user's activities on a website via the communication unit 241 and transmits the data to the habit engine 206 for determining a habit of the user. The controller 202 also transmits a suggestion determined based at least in part on the habit to the communication unit 241 for transmission to the client device 115. In other embodiments, the controller 202 receives activity data associated with a user on a social network from the social network engine 204 and transmits the data to an appropriate component. In other embodiments, the controller 202 receives data from a user interface generated by the user interface engine 212 and transmits the data to an appropriate component. For example, the controller 202 receives input for ignoring a suggestion from a user via a user interface and sends the input to the suggestion module 210 for adjusting the suggestion.

The social network engine 204 can be software including routines for generating and managing a social network. In some embodiments, the social network engine 204 can be a set of instructions executable by the processor 235 to provide the functionality described below for generating and managing the social network. In other embodiments, the social network engine 204 can be stored in the memory 237 of the server 101 and can be accessible and executable by the processor 235. In some embodiments, the social network engine 204 can be adapted for cooperation and communication with the processor 235 and other components of the server 101 via signal line 224.

In some embodiments, the social network engine 204 manages registration of users and creation of a user profile. The social network engine 204 also manages the association of different actions with the user profile including the publication of posts (e.g. text, links or media) to a selected audience, the publication of comments, indications of acknowledgement (e.g. approval, disapproval, thumbs up, thumbs down, like, dislike. etc.), uploading of media (e.g. photos, videos, etc.), check-ins to different locations and other actions associated with a social network.

In some embodiments, the social network engine 204 creates a social graph and an interest graph that are stored in the storage 105. The social graph includes the relationship between people in a social network and the interest graph that includes interests associated with the users. For example, when a first user follows a second user, the relationship is a first-degree relationship. If the second user follows a third user that the first user does not follow, the first user has a second-degree relationship with the third user. This relationship can also be described in terms of social affinity. The first user has a closer social affinity to the second user than the third user.

In some embodiments, the social network engine 204 also generates an affinity score between a pair of users in the social network. For example, the social network engine 204 generates a high affinity score for two users that follow each other and that frequently interact with each other. The social network engine 204 regularly updates the affinity score between the users. For example, if a first user removes a second user from a group or stops being friends with the second user, the social network engine 204 reduces the affinity score between the first and second users to reflect the relationship change. The social network engine 204 transmits the data (e.g., user activity data, affinity scores, social graph information, etc.) to the controller 202 for processing and organizing with other data sources. In some embodiments, the social network engine 204 also stores the data on the storage device 243.

The social network engine 204 manages the social network by handling registration of users, publication of content (e.g. posts, comments, photos, links, check-ins, etc.), hosting multi-user communication sessions, managing of groups, managing different sharing levels, updating the social graph, etc. The social network engine 204 registers a user by receiving information such as a username and password and generates a user profile that is associated with the user and stored as part of the social graph. In one embodiment, the user profile includes additional information about the user including interests (e.g. soccer, reading, food, subscriptions, gaming, etc.), activities (e.g. search history, indications of approval, posts, comments, multi-player online gaming, etc.), work (e.g., doctor, engineer, lawyer, research scientist, etc.), education (e.g., engineering, medicine, law, business, etc.) and demographics (e.g. age, ethnicity, location, etc.), etc. The social network engine 204 stores the user profile in the storage device 243.

In some embodiments users are connected in the social network by being friends. For example, users A and B can have reciprocal friendships with each other. In other embodiments, the relationships can be single directional, for example, when user A chooses to followed updates posted by user B. If user B chooses to follow user A, the relationship can be described as bi-directional or multi-directional. User B can choose to share updates with the public, which results in user A being able to view the update, or user B can share the updates with only people that user B follows. In some embodiments these relationships can be divided into groups on the social network based on context. Some areas of this disclosure refer to such groups as social groups. The groups can be used by the user to share information or send messages within the social network that is directed to that group. For example, user A can create an acquaintance group of users that user A wants to view updates from, but that user A does not know very well. In another example, user A can create a group of students taking the same class, e.g. a study group or people helpful for networking. In such examples, user A can use the created group to share information with or send messages directly to the members of the group.

The habit engine 206 can be software including routines for determining habits of users to identify when the users are available for social interactions. In some embodiments, the habit engine 206 can be a set of instructions executable by the processor 235 to provide the functionality described below for determining habits of users to identify when the users are available for social interactions. In other embodiments, the habit engine 206 can be stored in the memory 237 of the server 101 and can be accessible and executable by the processor 235. In some embodiments, the habit engine 206 can be adapted for cooperation and communication with the processor 235 and other components of the server 101 via signal line 226.

A habit of a user includes routine behaviors of the user that are repeated regularly. For example, the habit engine 206 determines a habit of a user including determining that the user is an all-day gamer, plays games intermittently or only plays games after the work day is over. In some embodiments, the habit engine 206 determines the habit of the user associated with a social network or a website. In other embodiments, the habit engine 206 determines the habit of the user based on a client device associated with the user.

In some embodiments, the habit engine 206 receives activity data of a user on a social network from the social network engine 204 and determines a habit of the user associated with the social network. In this case, the user is a member of the social network. In one example, the habit engine 206 receives activity data from the social network engine 204 showing that a user always comments on posts, shares pictures or sends new posts on a social network at the lunch hour during business days (e.g., Monday to Friday) and determines that a habit of the user is to view and modify the stream of content in the social network at noon while the user is working In another example, the habit engine 206 determines that the first thing a salesman does each morning when the salesman goes to work is to check notifications coming from certain groups of contacts on the social network (e.g., customers, supply companies) based on the activity data associated with the salesman on the social network. In yet another example, the habit engine 206 determines that a user plays games at 8:00 pm for about one hour every night because the user's activity data between 8:00 pm and 9:00 pm is usually related to game applications on the social network.

In other embodiments, the habit engine 206 receives activity data associated with a user on a website via the controller 202 and determines a habit of the user associated with the website. For example, the habit engine 206 determines that a user is a serious game player based on the user's game history on an online game website. In another example, the habit engine 206 determines that a user likes to spend weekends watching movies because the user keeps checking movies on a website during the weekends. In yet another example, the habit engine 206 determines that a user usually checks personal emails between 7:00 pm and 8:00 pm based on frequently accessing an email application during this time period. In some embodiments, the habit engine 206 determines a habit of a user based on activity data of the user on one or more websites. For example, the habit engine 206 checks a user's browsing history on multiple websites and determines that the user likes to do online shopping at a specific interval.

In some embodiments, the habit engine 206 determines a habit of a user based on a client device 115 associated with the user. For example, the habit engine 206 determines that a user works between 9:00 am and 5:00 pm because the user is using a work computer during this time interval. The habit engine 206 also determines that the user enjoys leisure time at home after 6:30 pm since the user's home computer is on.

In some embodiments, the habit engine 206 determines a habit of a user based on determining a location of a client device 115 associated with the user. The habit engine 206 determines a location of a client device 115 based on an internet protocol (IP) address associated with the client device, triangulation of signals from the client device 115, a global positioning system (GPS) installed on the client device 115, or an application used in the client device 115. For example, the habit engine 206 identifies that a user is working during 8:00 am-5:00 pm because an IP address of a computer associated with the user belongs to a company, triangulating signals or GPS signals from a tablet associated with the user indicate that the user is in a work place, or a cookie from a web browser on a computer associated with the user shows that the user is at work. In some other embodiments, the habit engine 206 determines a habit of a user based on a location history of a client device 115 associated with the user. For example, at the first time, the habit engine 206 receives a user login request from a computer, identifies an IP address associated with the login request, compares the IP address with a list of IP addresses, determines that the IP address was assigned to a company, and determines that the computer is a work computer. Later, when the habit engine 206 receives the same IP address, the habit engine 206 identifies that this IP address is associated with a work computer based on the location history and determines that the user is working.

In some embodiments, the habit engine 206 refines a habit of a user based on detecting activities of the user on a client device associated with the user. For example, the habit engine 206 receives activity data associated with a user on a work computer showing that the user opens multiple document editing applications in the morning, and determines that a habit of the user is to do paperwork in the morning. The habit engine 206 also receives activity data showing that the user puts the work computer in a suspend mode at 12:00 pm each day and determines that the user is having lunch at that time. The habit engine 206 further determines that the user leaves work at 6:00 pm based on activity data showing that the work computer is shutdown at that time.

In some embodiments, the habit engine 206 determines habits of a user including determining when the user accesses applications for personal use and when the user accesses applications for business use. For example, the habit engine 206 receives activity data describing that a first user and a second user frequently access their streams of content in a social network during work. Since the first user only accesses the portion of the content stream that includes the first user's contacts in the business group, the habit engine 206 categorizes these activities as business-oriented and determines a habit of the first user as contacting with business partners. On the other hand, the habit engine 206 determines that the second user is an insistent game player since the second user mainly accesses content under a "game" section in the second user's content stream.

In some embodiments, the habit engine 206 determines habits of a user and uses the habits to determine segments of time when the user is active on a social network. For example, the habit engine 206 determines that a first habit of a user is to view posts on the social network at noon during working days and a second habit of the user is to check notifications on the social network at 8:00 am every morning. Based on the first and second habits of the user, the habit engine 206 determines that the user is active on the social network at 8:00 am every morning and at noon during working days. Similarly, when the habit engine 206 determines habits of a user based on a website or a client device 115 associated with the user, the habit engine 206 can use these habits of the user to determine when the user is accessing the website or when the user is using the client device 115. In some embodiments, the habit engine 206 determines habits of a user associated with a social network based on activity data of the user on the social network. Once context for a group of activities performed by the user is determined, the habit engine 206 determines segments of time when the user is active on the social network with regarding to the context. Determining the context for activities of a user is described in detail below with reference to the context engine 208.

In some embodiments, the habit engine 206 determines habits of a first user and a second user, and identifies when the first and second users are available for social interactions based on the habits. For example, the habit engine 206 determines that both users are having leisure time at home after 5:30 pm, and identifies that they may have a group discussion of a homework problem at night or play games together.

In some embodiments, the habit engine 206 stores habits of a user in the storage device 243. In other embodiments, the habit engine 206 transmits the habits to the context engine 208 and the suggestion module 210 for further processing.

The context engine 208 can be software including routines for determining user context for a group of activities performed by a user. In some embodiments, the context engine 208 can be a set of instructions executable by the processor 235 to provide the functionality described below for determining user context for a group of activities performed by a user. In other embodiments, the context engine 208 can be stored in the memory 237 of the server 101 and can be accessible and executable by the processor 235. In some embodiments, the context engine 208 can be adapted for cooperation and communication with the processor 235 and other components of the server 101 via signal line 228.

The context engine 208 analyzes activity data describing a group of activities and determines user context for the group of activities based on the analysis. For example, the context engine 208 identifies, from activity data associated with a user, that the user accesses mobile game applications and determines that these mobile game applications are related to two games: a pattern matching game and an exploding bomb game. One skilled in the art will recognize that many algorithms and methods can be used in determining user context.

In some embodiments, the context engine 208 determines a context related to times when the user is available for social interaction. For example, the habit engine 206 determines a habit of a user from user activities associated with a social network, a website or a client device 115. Responsive to receiving the habit from the habit engine 206, the context engine 208 determines user context for the activities associated with the habit. For example, the habit engine 206 determines that a user works from 8:00 pm to 5:00 pm Monday through Friday, plays games at about 7:00 pm every night, comments on posts or uploads pictures on a social network for about one hour after 10:00 pm every night, and watches movies every weekend. Responsive to receiving the habits and associated activities, the context engine 208 determines that the user works in the area of family law (e.g., by analyzing context of emails between contacts in a colleague group), determines that the user likes to play a game (e.g., by analyzing which game application the user opens most), determines that the user likes travel (e.g., by analyzing the topic that the user most comments) and especially likes "Yellowstone" (e.g., by determining that many uploaded pictures are taken in "Yellowstone"), and determines that the user is a fan of action movies (e.g., by categorizing movies ordered from a website on weekends). As a result, the suggestions can be highly tailored to the user's interests during those time periods. For example, if the user is interests in a picture context from 10-11 pm every night, the pictures can be about travel, Yellowstone or action movies. In other embodiments, the context engine 208 also identifies metadata associated with the user context. For example, the context engine 208 determines that a time when a user started to exchange emails with colleagues, a level that a user has reached in playing a game, the user's location when the user uploaded a picture, etc.

In some embodiments, once the context engine 208 determines user context for activities associated with the habits of a user, the habit engine 206 uses the habits to determine segments of time when the user is active on a social network with regard to the user context. For example, the context engine 208 determines that the context for Sarah is that she is available for interacting with images on a social network at noon based on her habit of uploading pictures on the social network at that time.

In some embodiments, the context engine 208 communicates with the social network engine 204 to further refine the context based on a subject. For example, the context engine 208 identifies a group created by a user in a social network that is associated with a specific context. For example, based on information (e.g., a user profile, user activities on a social network, etc.) associating the user with food received from the social network engine 204, the context engine 208 identifies a "yummy food" group in a social network created by Tom who has a habit of looking for delicious food on weekends.

The context engine 208 identifies a matching context for activities associated with a first user and a second user. In some embodiments, the context engine 208 determines the second user's context engine 208 based on the second user's current activity. For example, the context engine 208 determines that the first user is available for social interactions related to playing a game based on the first user's context and the context engine 208 determines that the second user's context is also playing games because the second user is currently playing a game. As a result, even though the second user might not usually play games at this particular time, because the second user is currently playing the game, there is a possibility of a good match between the users. In another example, where the first user previously approved of content related to cooking and the second user shared an article about cooking, the context engine 208 identifies that the matching context for the first and second users is the article about cooking.

In some embodiments the context engine 208 identifies a group associated with the matching context. The group is created by the first user in a social network. A suggestion may be made to invite the second user join the group if certain criteria are satisfied. Providing a suggestion based on a set of criteria will be described in detail below with reference to the suggestion module 210. Continuing with the above example, the context engine 208 identifies that Tom is posting a picture of the best Italian food that he's ever had in an Italian restaurant. The context engine 208 also identifies that Jerry is asking where he can find good Italian food. The context engine 208 determines that Tom's activity and Jerry's activity has a matching context of "food" or "Italian food." This facilitates social interactions between Tom and Jerry, for example, inviting Jerry to join the "yummy food" group created by Tom in the social network. In some other embodiments, the context engine 208 identifies a matching context for activities associated with a first user and a second user, and identifies a group created on a third party website with a matching context. For the above example, the context engine 208 identifies a group on a third party website (e.g., a "customers" group on the website of the Italian restaurant). In this case, both the first user and the second user may receive suggestions to join the group.

The suggestion module 210 can be software including routines for generating a suggestion for a user and adjusting the suggestion based on feedback from the user. In some embodiments, the suggestion module 210 can be a set of instructions executable by the processor 235 to provide the functionality described below for generating a suggestion for a user and adjusting the suggestion based on feedback from the user. In other embodiments, the suggestion module 210 can be stored in the memory 237 of the server 101 and can be accessible and executable by the processor 235. In some embodiments, the suggestion module 210 can be adapted for cooperation and communication with the processor 235 and other components of the server 101 via signal line 230.

The suggestion module 210 communicates with the habit engine 206 and the context engine 208 to provide a suggestion for a first user. For example, Jenny plays games at noon. After playing a game for a while, she is tired of playing the game alone or she wants somebody to challenge her in the game. She wants to invite somebody to play the game with her. Instead of Jenny manually choosing a friend to play with her in the game, the suggestion module 210 communicates with the habit engine 206 and the context engine 208 to determine that Mary has a habit of playing a game at noon and to suggest to Jenny that she play a game with Mary so that both users can have a satisfying experience.

In some embodiments, the suggestion module 210 generates a suggestion for a first user that includes at least a second user with whom the first user can socially interact. The suggestion includes, but is not limited to, the first user joining the second user in an activity in a social network, the first user adding the second user to a group created by the first user in the social network, the first user adding the second user to a group on a third-party website, etc. In some embodiments, the context engine 206 determines user context for activities associated with a habit of a first user, determines that user context for activities associated with a habit of a second user matches the user context of the first user, and suggests the second user to the first user. The first user is an initiator and the second user is a recipient. The suggestion module 210 determines the match of user context based at least in part on time information, a likelihood that the recipient would respond a suggestion, location information, etc. In some embodiments, the suggestion module 210 also generates a suggestion for a first user including adding the first user to a group that the second user belongs to (e.g., on a third-party website). In other embodiments, the suggestion module 210 generates a suggestion for an initiator responsive to receiving a request from the initiator.

In some embodiments, the suggestion module 210 identifies a time when a first user and a second user are available for social interactions associated with an activity having a matching context, and generates a suggestion for the first user based on the time and the activity. The activity includes the first user engaging with a photo shared by the second user, playing a game, the first user joining a group that the second user belongs to, sharing a post from the second user with the first user, etc. For example, Jenny wants to invite a person to play a game with her. The habit engine 206 determines that Jenny's habit is to play games from 7:00 pm to 9:00 pm Monday to Thursday, determines that Tom's habit is to play games from 7:00 pm to 10:00 pm every day, and determines that Mary's habit is to play games from 6:00 pm to 8:30 pm every Tuesday and Thursday. The context engine 208 determines that both Jenny and Mary are playing a pattern matching game while Tom is playing an exploding bomb game. The suggestion module 210 therefore determines that the time for Jenny and Mary being available to play the pattern matching game is 7:00 pm to 8:30 pm every Tuesday and Thursday, and generates a suggestion for Jenny, e.g., joining Mary in playing the pattern matching game with her between 7:00 pm and 8:30 pm every Tuesday and Thursday. A user may choose a person having a similar interest to send an invitation for joining a social interaction. For example, Jenny can invite Bob, a friend of hers on a social network, to play the pattern matching game together because she knows that Bob also likes playing the pattern matching game as Bob often posts his game scores on the social network. The suggestion module 210 is more advantageous in determining a recipient than a manual selection because it not only counts in the similar interest based on users' habits, but more importantly, the suggestion module 210 also takes the user's availability at a specific time into account when making a suggestion. For example, Bob may not respond Jenny's invitation since he only plays the game at noon. However, Mary, the recipient suggested by the suggestion module 210 plays the same game at the same time that Jenny plays and therefore is more likely to respond the invitation from Jenny.

In some embodiments, the suggestion module 210 determines a likelihood that a first user and a second user in a social network are available at a time for social interactions having a matching context, determines that the likelihood exceeds a threshold probability, determines that the time is available for the first user and the second user establishing the social interactions based on the likelihood exceeding the threshold probability, and generates a suggestion for the first user. For example, the suggestion module 210 determines that there is a 70% chance that two users will play a game together after 8:00 pm on Thursday and that 70% is greater than a threshold 50%. As a result, the suggestion module 210 will generate a suggestion to one of the users to invite the other user to play the game after 8:00 pm on Thursday. In some embodiments, the suggestion module 210 specifies a pre-determined threshold probability. In other embodiments, the suggestion module 210 can also adjust the threshold probability.

In some embodiments, the suggestion module 210 determines the likelihood based in part on location information. For example, the habit engine 206 determines a time period that Tom can do a project with Ryan based on their habits and a same user context associated with their activities. The habit engine 206 also determines that Ryan is on vacation based on the uploaded photos and timestamps on the photos. The suggestion module 210 receives this information from the habit engine 206 and generates a likelihood that Tom and Ryan can do the project at the time period. If the likelihood exceeds a threshold probability, the suggestion module 210 will suggest Ryan to Tom. Otherwise, no suggestion will be made.

In other embodiments, the suggestion module 210 determines the likelihood based on an electronic communication history (e.g., an email history). For example, the suggestion module 210 receives from the habit engine 206 that Dave is only open to social interactions once a day when he checks emails. As a result, even though Dave engages in the same social activities as Mike, the suggestion module 210 determines a low likelihood that Dave and Mike would engage in an activity with a matching context unless it is at the time that Dave checks his emails.

In other embodiments, the suggestion module 210 determines the likelihood based on other information such as a game history. For example, the suggestion module 210 receives from the habit engine 206 that Jane has been playing a pattern matching game for a while and started to play an exploding bomb game recently. The suggestion module 210 receives from the habit engine 206 that Jane may get bored playing the pattern matching game, as evidenced by her historical average playing time, and therefore lowers the likelihood to suggest a person to play this game with Jane. However, the suggestion module 210 also receives from the habit engine 206 that Jane will spend 40 minutes playing a new game. As a result, the suggestion module 210 determines that Jane has a high likelihood of engaging with another person if the suggestion is to play a new game, for example, an exploding bomb game with that person.

In some embodiments, the suggestion module 210 determines the likelihood based on a combination of location information, electronic communication histories, browsing histories and other information. When determining a suggestion for an initiator about a recipient with whom the initiator should trigger a social interaction (e.g., inviting a recipient for a social interaction), the suggestion module 210 uses the likelihood to determine which recipient will most likely interact with the initiator and generates a suggestion for the initiator to include this recipient. This way, the suggestion module 210 not only maximizes the probability of establishing a relationship between an initiator and a recipient (e.g., by the recipient accepting the invitation) but also maximizes the probability of interactions between the initiator and the recipient being successful. For example, the suggestion module 210 suggests that Tom share a photo with Mary not only because Mary is most likely to accept Tom's invitation for sharing the photo but also because Mary is most likely to comment on the photo, re-share the photo and interact with Tom about the photo in other ways.

In some embodiments, the suggestion module 210 receives an affinity score between a pair of users in a social network from the social network engine 204 and generates a suggestion for a user based on matching the users with the affinity score. For example, the suggestion module 210 determines that Jane can ask for help from Julie and Linda for doing homework. Since Jane and Julie frequently interact with each other, the affinity score between Jane and Julie is much higher than the affinity score between Jane and Linda. As a result, the suggestion module 210 may only suggest Julie to Jane.

In some embodiments, the suggestion module 210 determines weights associated with different aspects of a likelihood that the first and second users are available (e.g., location information, electronic communication histories, browsing histories, etc.) and affinity scores, and determines a recipient to be included in a suggestion based on the weights. For example, the suggestion module 210 includes a recipient having a highest weighted sum in the suggestion sent to an initiator. In the case where more than one recipient is included in a suggestion, the suggestion module 210 may order the recipients according to the weighted sums in the suggestion.

In some embodiments, when suggesting to a first user about a second user, the suggestion module 210 limits a pool of potential users from which the second user is selected based on instructions from the first user, such as by limiting interactions to a type or level of user in the social network. For example, Jenny specifies a user preference that excludes her business contacts in a social network from receiving suggestions that would indicate that she is playing a game, especially since Jenny often plays games during working hours. In some embodiments, the suggestion module 210 receives a signal from an application and uses the signal to ensure the safety of a suggestion. Continuing with the above example, at the time when Jenny signs in to the game application, the game application generates a signal based on her inputs that she does not want to share the game application with any business contact. The suggestion module 210 receives this signal and provides a suggestion of players to Jenny based at least in part on this signal.

The suggestion module 210 suggests a recipient to an initiator. The initiator is a first user and the recipient is a second user. In some embodiments, both users are members of a social network. The suggestion module 210 generates a suggestion based on user activities associated with the first and second user on the social network. For example, Tom and Jerry are acquaintances in a social network. The suggestion module 210 suggests that Tom join Jerry in studying based on the common habits of discussing math homework at 9:00-10:00 pm every night on the social network. Once Tom accepts the suggestion and Jerry responds to the suggestion, the social network engine 204 adds Jerry to a math study group created by Tom in the social network. In some embodiments, Tom already had Jerry in an acquaintance group and now Jerry is also part of Tom's math study group in the social network.

In other embodiments, only one of the users is a member of a social network. The suggestion module 210 generates a suggestion including the second user to the first user based on user activities associated with the first and second users on a website outside the social network. The suggestion can be related to the social network, for example, inviting the second user to join a group created by the first user in the social network. For example, Tom likes to search cooking recipes at night on a cooking website. Jerry also likes to post cooking recipes and comments on recipes posted by others at night on the same cooking website. Tom is a member of a social network and Tom does not know Jerry on the social network. The suggestion module 210 suggests Jerry to Tom and the social network engine 204 communicates with the suggestion module 210 to add Jerry in Toms' "recipe lover" group in the social network so that Tom can ask questions about recipes from Jerry. In some other embodiments, neither the first user nor the second user is a member of a social network. The suggestion module 210 generates a suggestion that the second user add the first user based on user activities associated with the first and second user on a third-party website outside the social network. The suggestion includes adding the first user to a group that the second user belongs to on the third-party website. For example, the suggestion module 210 determines that two users like to shop for shoes on a website, determines that one of the user belongs to a "best shoe deal" group on the website, and suggests the other user to join this "best shoe deal" group on the website that the other user belongs to.

In some embodiments, the suggestion module 210 generates a suggestion for a user, receives feedback about the suggestion from the user and modifies the suggestion based on the feedback. For example, the suggestion module 210 receives a response from Tom that he cannot reach the recipient Mary in a first suggestion sent to Tom. As a result, the suggestion module 210 drops Mary from a recipient list in the first suggestion. In another example, responsive to Tom ignoring a second suggestion, the suggestion module 210 modifies the threshold probability that was used to generate the second suggestion. If the threshold probability for the second suggestion was 50%, the suggestion module 210 may increase this threshold probability to 70% such that a third suggestion that is more attractive to Tom can be generated.

In some embodiments, the suggestion module 210 presents a suggestion to a user by sending an email, sending a text, sending an instant message, putting the suggestion in a stream of a social network or displaying a direct message in a message box. In some embodiments, the suggestion module 210 determines how to send a suggest based on instructions received from a user.

In some embodiments, the suggestion module 210 generates a suggestion for a user and presents the suggestion to the user in real-time. For example, responsive to receiving a request from Julie asking who can help her solve a homework problem, the suggestion module 210 finds that Andrew can help her and suggests that Julie ask for Andrew's help. In another example, when Tom and Ivy share pictures of Mars published by NASA and comment on articles talking about exploring Mars in a social network, the suggestion module 210 generates a suggestion that Tom add Ivy to a group (e.g., within the social network or on a third-party website) and presents a real-time suggestion to Tom. In other embodiments, the suggestion module 210 presents the suggestion to a user based on availability of a user. For example, the habit engine 206 determines that one of Joan's habits is to check her email between 8:00 am and 9:00 am every day. When the suggestion module 210 generates a suggestion for Joan, the suggestion is delivered between 8:00 am and 9:00 am.

The user interface engine 212 can be software including routines for generating a user interface that displays user profiles (e.g. posts, name, education, working history), user inputs and a social network (e.g. posts, photos, videos, comments). In some embodiments, the user interface engine 212 can be a set of instructions executable by the processor 235 to provide the functionality described below for generating the user interface. In other embodiments, the user interface engine 212 can be stored in the memory 237 of the server 101 and can be accessible and executable by the processor 235. In some embodiments, the user interface engine 212 can be adapted for cooperation and communication with the processor 235 and other components of the server 101 via signal line 232.

In some embodiments, each time the suggestion module 210 sends a suggestion to a user, the user interface engine 212 generates graphical data for displaying the suggestion on a user interface. For example, when the suggestion module 210 generates a suggestion for Tom to invite Jerry to join him in a meeting, the user interface engine 212 generates graphical data for displaying the suggestion to Tom. In some embodiments, the suggestion box is color coded or symbolically coded so that the user would not miss the information. In other embodiments, the user interface engine 212 also generates a user interface to receive a user input. Continuing with the above example, the user interface engine 212 receives input from Tom for accepting or ignoring the invitation on a user interface.

Figure 3A:
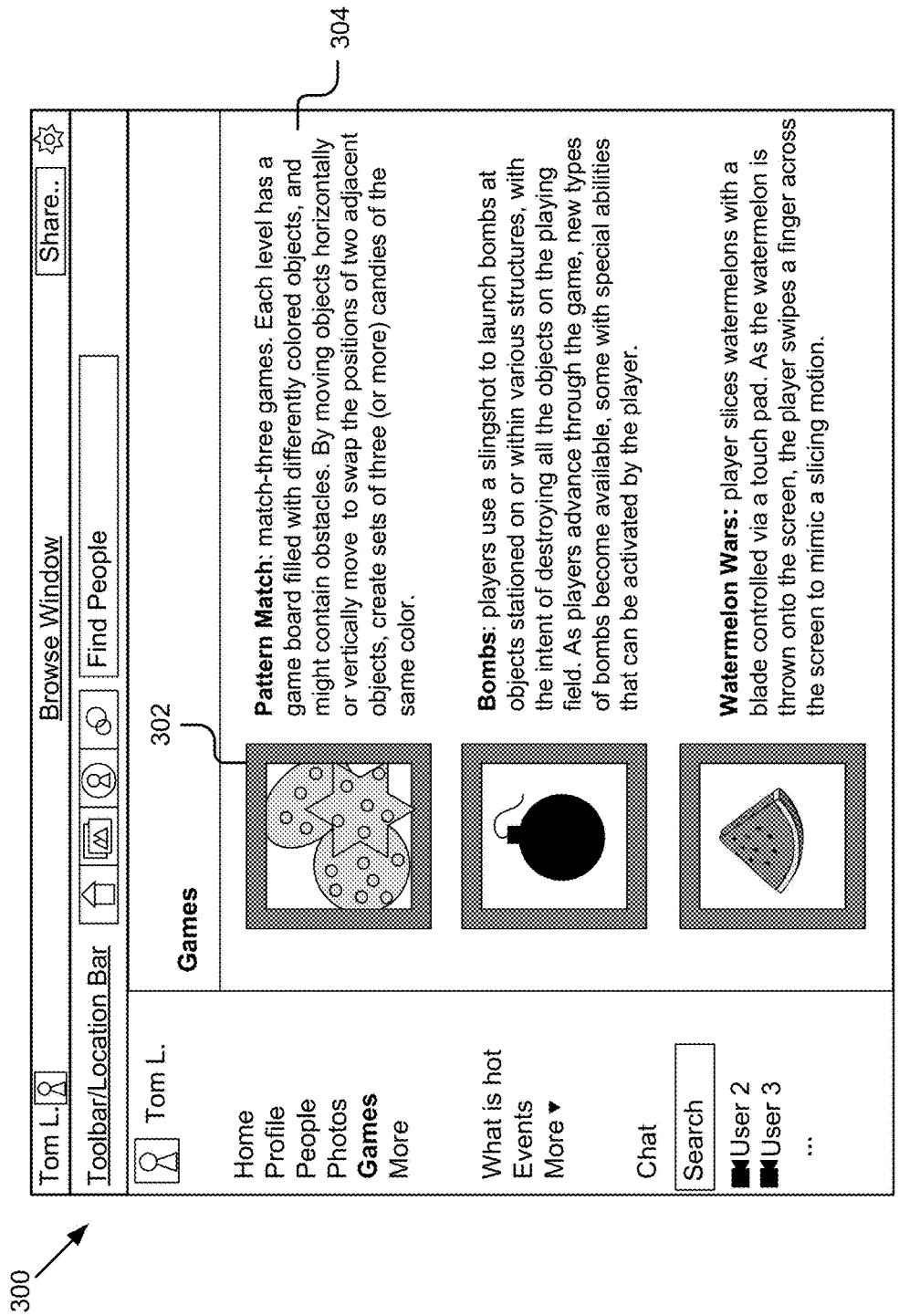
FIG. 3A is a graphic representation of an example user interface for displaying games that a user is playing.

Referring now to FIGS. 3A-3D, 4 and 5, various example methods and graphic representations of example user interfaces of the specification will be described. FIG. 3A is a graphic representation of an example user interface 300 for displaying games that a user is playing. The user interface 300 includes three games that user Tom L. is playing in a social network, e.g., "Pattern Match," "Bombs" and "Watermelon Wars." The user interface 300 includes an image icon for each game (e.g., 302) and a short description for each game (e.g., 304).

Figure 3B:
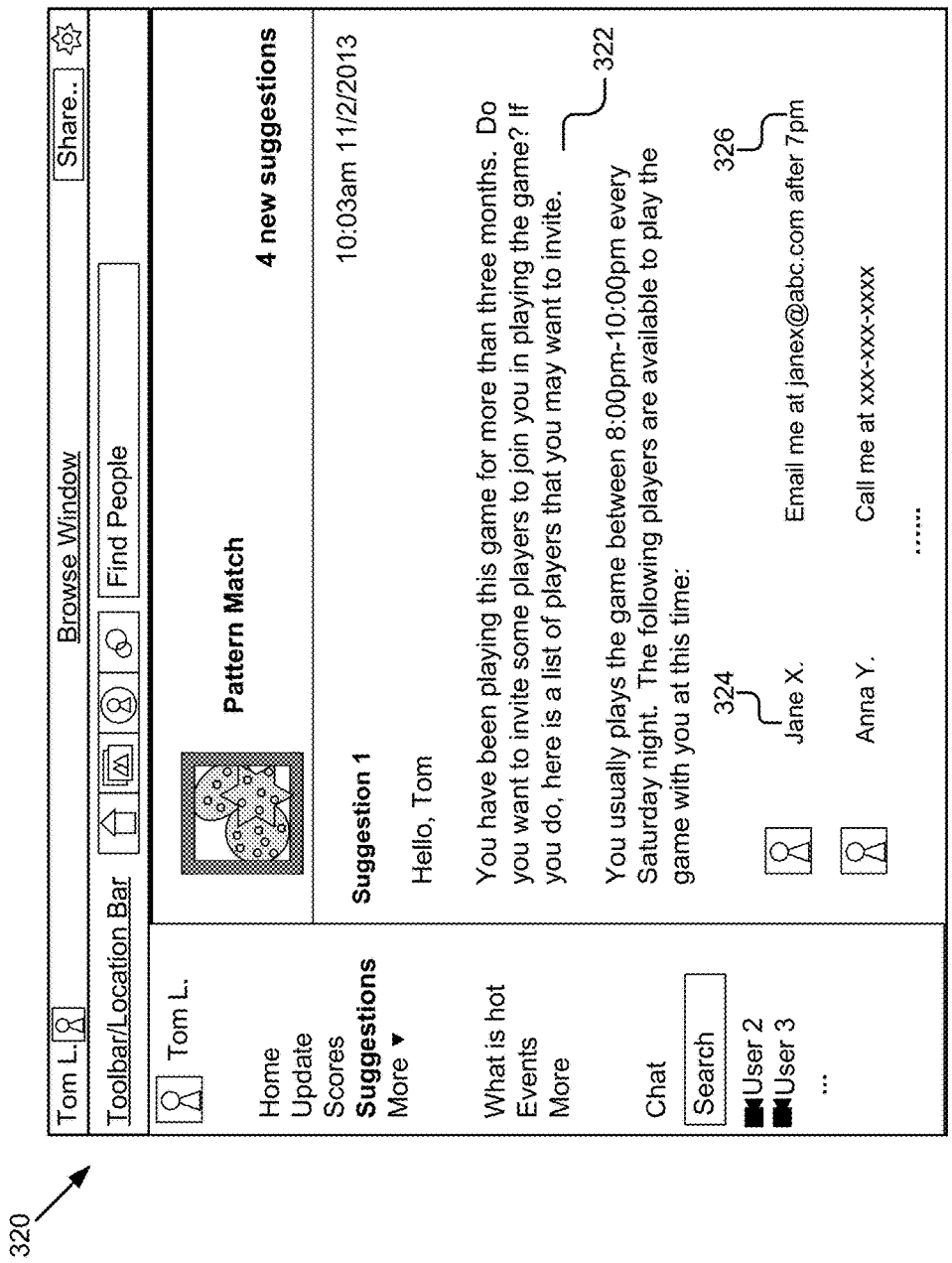
FIG. 3B is a graphic representation of an example user interface for presenting a first suggestion to a user.

FIG. 3B is a graphic representation of an example user interface 320 for presenting a first suggestion to a user. The user interface 320 includes four suggestions for the user Tom L. about the game "Pattern Match" that he is playing. The first suggestion 322 provides a list of players whom Tom might want to invite to play "Pattern Match." The habit engine 206 identifies that Tom plays "Pattern Match" between 8:00 pm and 10:00 pm every Saturday night and determines the list of players based at least in part on the time. The list of players includes names of players and communication means that the players prefer. For example, the list in the suggestion 322 includes a name 324 (e.g., Jane X.) and an email address (e.g., Jane prefers to be connected with emails). The suggestion module 210 communicates with the user interface engine 212 to generate and present the suggestion 322 to Tom on Nov. 2, 2013.

Figure 3C:
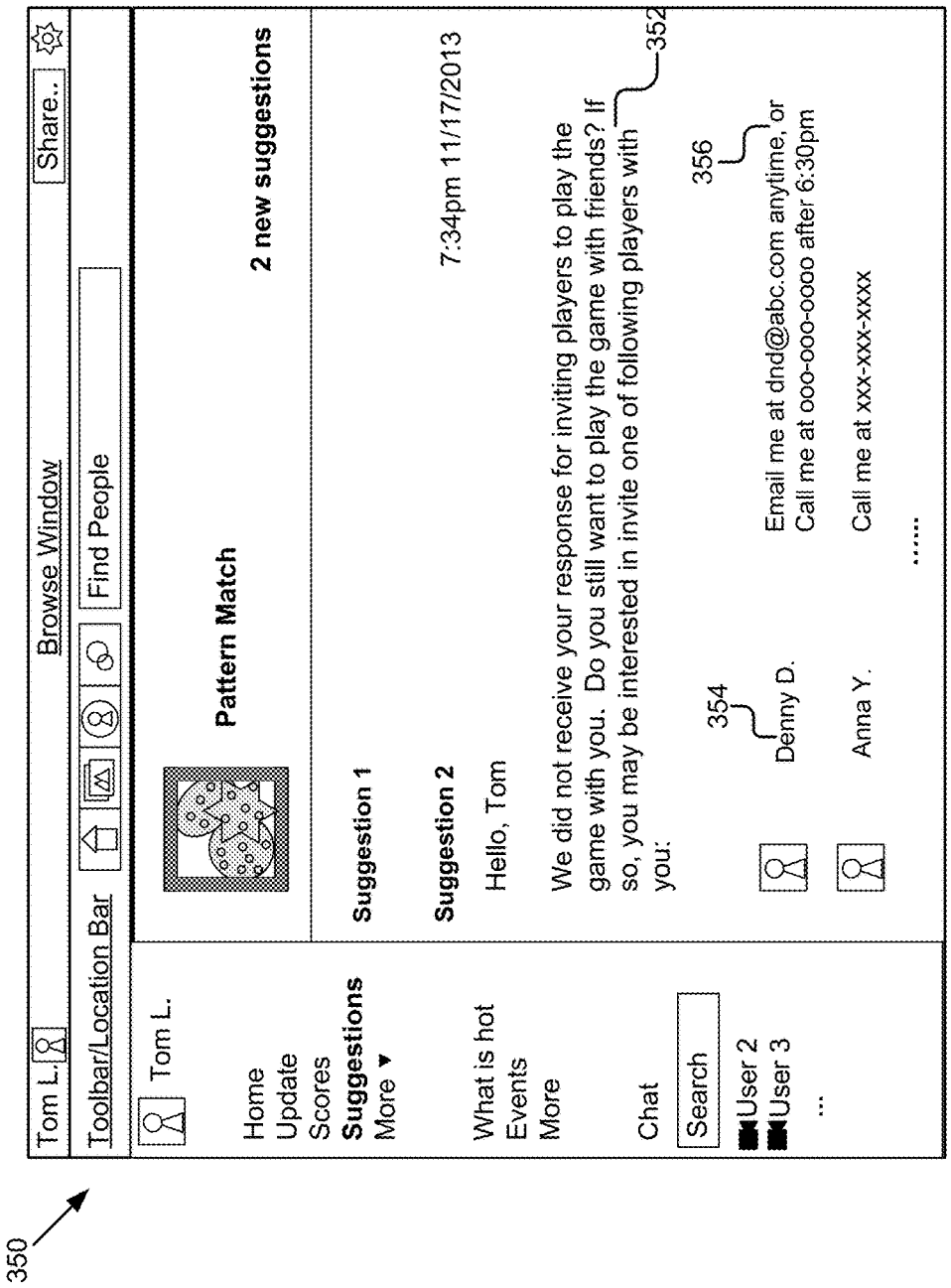
FIG. 3C is a graphic representation of an example user interface for presenting a second suggestion to a user responsive to the user ignoring the first suggestion depicted in FIG. 3B.

FIG. 3C is a graphic representation of an example user interface 350 for presenting a second suggestion to a user responsive to the user ignoring the first suggestion depicted in FIG. 3B. The user interface 250 includes two new suggestions. Since Tom ignores the first suggestion generated by the suggestion module 210 on Nov. 2, 2013 (as depicted in FIG. 3B), the suggestion module 210 receives no response from Tom and adjusts the suggestions sent to Tom. As a result, the suggestion module 210 generates a new suggestion for Tom on Nov. 17, 2013. The new suggestion, depicted as the suggestion 2 in FIG. 3C, includes a new list of players whom Tom can invite to play "Pattern Match." The new list includes a Denny D. 354 who can be connected by an email or a phone number listed in 356. The suggestion module 210 may generate other suggestions (not shown) for Tom. For example, based on Tom ignoring the first suggestion of users with whom to play "Pattern Match," the suggestion module 210 suggests a list of users with whom Tom can play "Bombs."

Figure 3D:
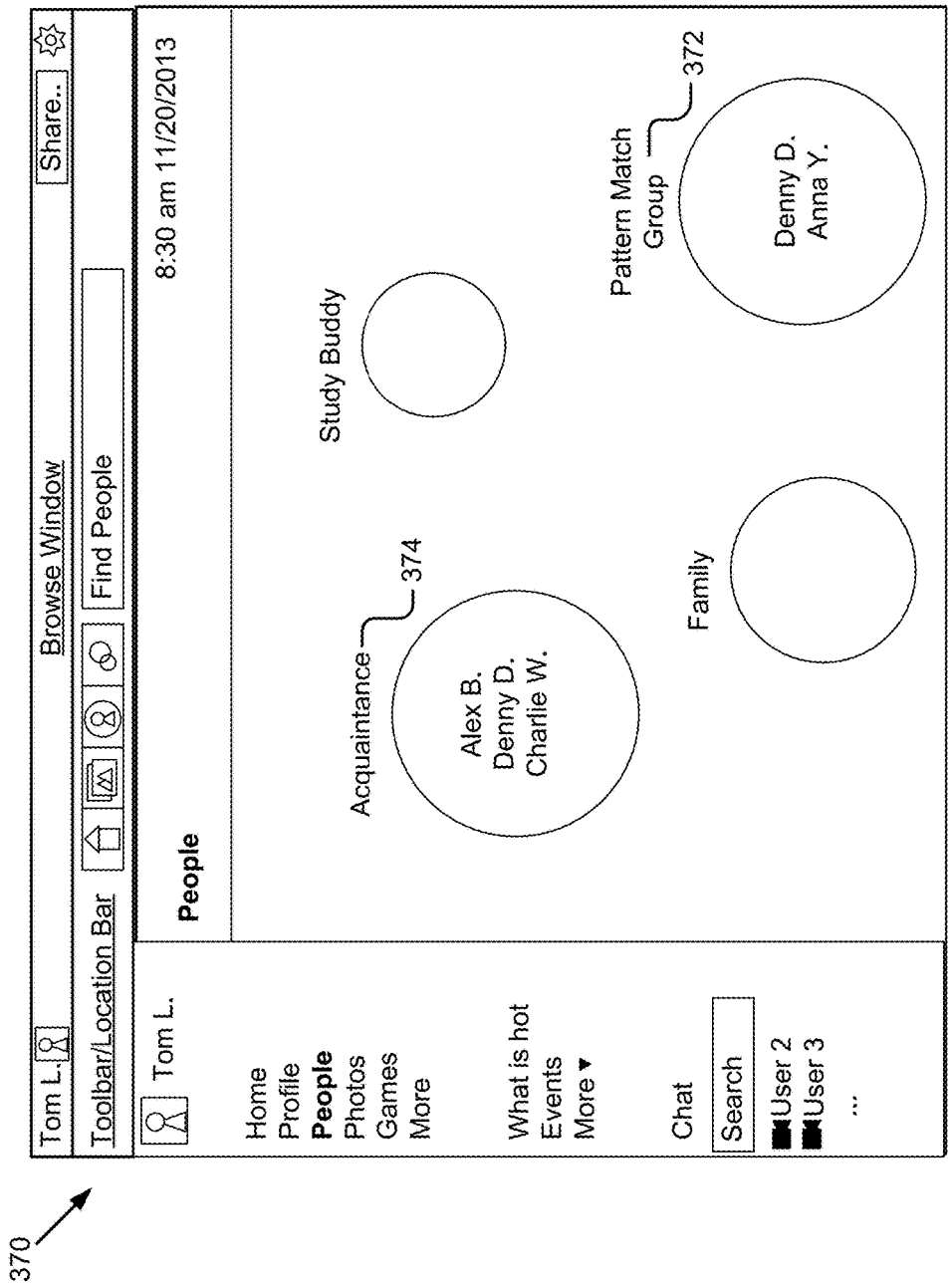
FIG. 3D is a graphic representation of an example user interface for displaying groups of a user in a social network after users have responded to the second suggestion depicted in FIG. 3C.

FIG. 3D is a graphic representation of an example user interface 370 for displaying groups of a user in a social network after users respond the second suggestion depicted in FIG. 3C. The user interface 370 includes Tom's groups in a social network. One of the groups is a "Pattern Match Group" 372 created by Tom for including players with whom he plays "Pattern Match." Once Tom invited Denny D. and Anna Y. (which are included in the suggestion depicted in FIG. 3C) to join him in playing "Pattern Match," and Denny and Anna responded Toms' invitation and played "Pattern Match" with Tom in the social network, Denny and Anna were added to the "Pattern Match Group." Denny is also in Tom's acquaintance group 374, which means that Denny was one of Tom's contacts in the social network before Tom and Denny established a connection based on playing "Pattern."

Figure 4:
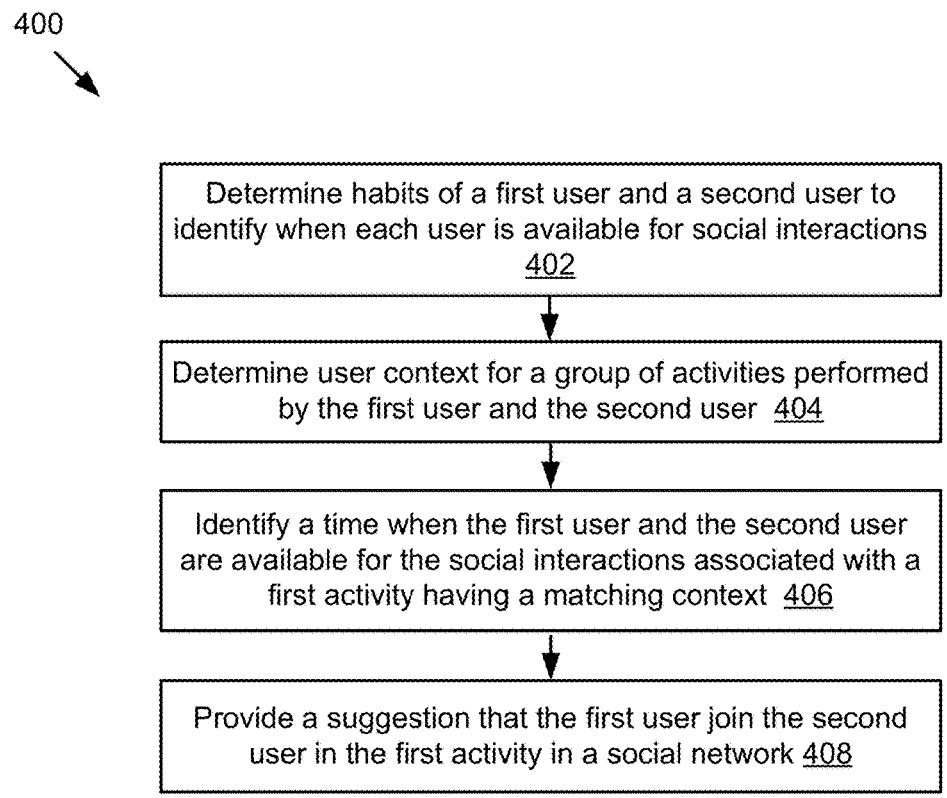
FIG. 4 is a flowchart of an example method for generating a suggestion identifying a second user available for a social interaction with a first user.

FIG. 4 includes a flowchart 400 of an example method for using a connection application 103 to suggest a first user about a second user with whom the first user should trigger social interactions based at least in part on user context for activities associated with habits of users in a specific time. The connection application 103 includes a habit engine 206, a context engine 208 and a suggestion module 210.

The habit engine 206 determines 402 habits of a first user and a second user to identify when each user is available for social interactions. A habit of a user includes routine behaviors of the user that are repeated regularly. For example, the habit engine 206 determines a habit of a user including determining that the user is an all-day gamer or determining that the user is a strict worker. In some embodiments, the habit engine 206 determines habits of a user and uses the habits to determine segments of time when the user is active on a social network. For example, the habit engine 206 determines that a first habit of a user is to view posts on the social network at noon in working days and a second habit of the user is to check notifications on the social network at 8:00 am every morning. Based on the first and second habits of the user, the habit engine 206 determines that the user is active on the social network at 8:00 am every morning and at noon in the working days.

The context engine 208 determines 404 user context for a group of activities performed by the first user and the second user. The context engine 208 analyzes activity data describing a group of activities and determines user context for the group of activities based on the analysis. For example, the context engine 208 identifies, from activity data associated with a user, many records that the user accesses mobile game applications and determines that these mobile game applications are related to two games: "Pattern Match" and "Bombs."

The suggestion module 210 identifies 406 a time when the first user and the second user are available for the social interactions associated with a first activity having a matching context and provides 408 a suggestion that the first user join the second user in the first activity in a social network. The first activity includes the first user engaging with a photo shared by the second user, playing a game, the first user joining a group that the second user belongs to, sharing a post from the second user with the first user, etc. For example, Jenny wants to invite a person to play game with. The habit engine 206 determines that Jenny's habit is to play games from 7:00 pm to 9:00 pm Monday to Thursday, determines that Tom's habit is to play games from 7:00 pm to 10:00 pm every day, and determines that Mary's habit is to play games from 6:00 pm to 8:30 pm every Tuesday and Thursday. The context engine 208 determines that both Jenny and Mary are playing "Pattern Match" while Tom is playing "Bomb." The suggestion module 210 therefore determines that the time for Jenny and Mary being available to play "Pattern Match" is 7:00 pm to 8:30 pm every Tuesday and Thursday. The suggestion module 210 generates a suggestion for Jenny, e.g., joining Mary in playing "Pattern Match" with her between 7:00 pm and 8:30 pm every Tuesday and Thursday.

Figure 5:
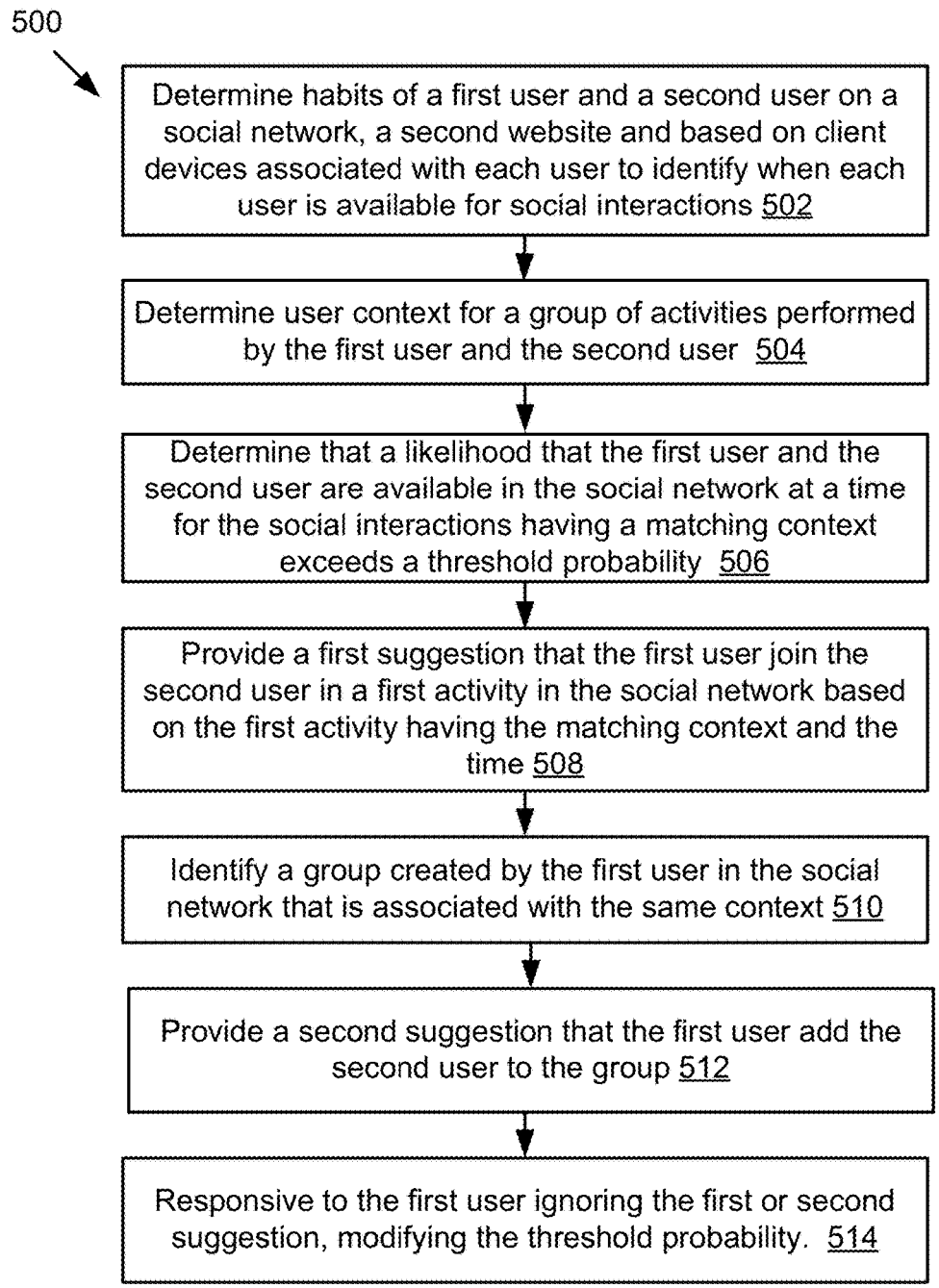
FIG. 5 is a flowchart of another example method for generating a suggestion identifying a second user available for a social interaction with a first user.

FIG. 5 includes a flowchart 500 of an example method for using a connection application 103 to suggest a first user to a second user with whom the first user should trigger social interactions based at least in part on user context for activities associated with habits of users at a specific time. The connection application 103 includes a social network engine 204, a habit engine 206, a context engine 208 and a suggestion module 210.

The habit engine 206 determines 502 habits of a first user and a second user on a social network, a second website and based on client devices associated with each user to identify when each user is available for social interactions. In some embodiments, the habit engine 206 receives activity data of a user on a social network from the social network engine 204 and determines a habit of the user associated with the social network. For example, the habit engine 206 receives activity data from the social network engine 204 showing that a user comments on posts, shares pictures or sends new posts on a social network at the lunch hour during working days (e.g., Monday to Friday) and determines that a habit of the user is to view and modify the stream of content in the social network at noon in the working days.

In other embodiments, the habit engine 206 receives activity data associated with a user on a website and determines a habit of the user associated with the website. For example, the habit engine 206 determines that a user is an insistent game player based on the user's play history on an online game website. In some other embodiments, the habit engine 206 determines a habit of a user based on a client device associated with the user. For example, the habit engine 206 determines that a user works between 9:00 am and 5:00 pm because the user is using a work computer during this interval. The habit engine 206 also determines that the user enjoys leisure time at home after 6:30 pm since the user's home computer is on.

In some embodiments, the habit engine 206 identifies when the first and second users are available for social interactions based on the habits. For example, the habit engine 206 determines that both users are having leisure time at home after 5:30 pm, and identifies that they may have a group discussion of a homework problem at night or play games together.

The context engine 208 determines 504 user context for a group of activities performed by the first user and the second user. Responsive to receiving the habits from the habit engine 206, the context engine 208 determines user context for the activities associated with the habit. For example, the habit engine 206 determines that a user works from 8:00 am to 5:00 pm Monday through Friday, plays games at about 7:00 pm every night, comments posts or uploads pictures on a social network for about one hour after 10:00 pm every night, and watches movies every weekend. Responsive to receiving the habits and associated activities, the context engine 208 determines that the user works in the area of patent law (e.g., by analyzing context of emails between contacts in a colleague group), determines that the user likes to play "Pattern Match" (e.g., by analyzing which game application the user opens most), determines that the user likes travel (e.g., by analyzing the topic that the user most comments) and especially likes "Yellowstone" (e.g., by determining that many uploaded pictures are taken in "Yellowstone"), and determines that the user is a fan of action movies (e.g., by categorizing movies ordered from a website on weekends).

The suggestion module 210 determines 506 that a likelihood that the first user and the second user are available in the social network at a time for the social interactions having a matching context exceeds a threshold probability. For example, the suggestion module 210 determines that there is a 70% chance that two users will play a game together after 8:00 pm on Thursday and that 70% is greater than a threshold 50%. As a result, the suggestion module 210 will generate a suggestion to one of the users to invite the other user to play the game after 8:00 pm on Thursday. In some embodiments, the suggestion module 210 determines the likelihood based on location information, electronic communication histories, browsing histories and other information. When determining a suggestion for an initiator about a recipient with whom the initiator should trigger a social interaction (e.g., inviting a recipient for a social interaction), the suggestion module 210 uses the likelihood to determine which recipient will most likely interact with the initiator and generates a suggestion for the initiator to include this recipient.

The suggestion module 210 provides 508 a first suggestion that the first user join the second user in a first activity in the social network based on the first activity having the matching context and the time. For example, Tom and Jerry are acquaintances in a social network. The suggestion module 210 suggests Jerry to Tom based on the common habits of discussing math homework from 9:00-10:00 pm every night on the social network. Once Tom accepts the suggestion and Jerry responds the suggestion, the social network engine 204 adds Jerry to a math study group created by Tom in the social network. In other embodiments, only one of the users is a member of a social network.

The context engine 208 identifies 510 a group created by the first user in the social network that is associated with the matching context. For example, based on information (e.g., a user profile) received from the social network engine 204, the context engine 208 identifies a "yummy food" community in a social network created by Tom who has a habit of looking for delicious food on weekends.

The suggestion module 210 provides 512 a second suggestion that the first user add the second user to the group. Continuing with the above example, the context engine 208 identifies that Tom is posting a picture of the best Italian food that he's ever had in an Italian restaurant. The context engine 208 also identifies that Jerry is asking where he can find good Italian food. The context engine 208 determines that Tom's activity and Jerry's activity has matching context "Italian food." To facilitate social interactions between Tom and Jerry, the suggestion module 210 provides a second suggestion, for example, inviting Jerry to join the "yummy food" community created by Tom in the social network. In some other embodiments, the identified group is created on a third party website with the matching context. For the above example, the context engine 208 identifies a group on a third party website (e.g., a "customers" group on the website of the Italian restaurant).

Responsive to the first user ignoring the first or second suggestion, the suggestion module 210 modifies 514 the threshold probability. For example, responsive to Tom ignoring the second suggestion, the suggestion module 210 modifies the threshold probability that was used to generate the second suggestion. If the threshold probability for the second suggestion was 50%, the suggestion module 210 may increase this threshold probability to 70% such that a third suggestion that is more attractive to Tom can be generated.

In the following description, for purposes of explanation, numerous specific details are set forth in order to provide a thorough understanding of the specification. It will be apparent, however, to one skilled in the art that the technology can be practiced without these specific details. In other embodiments, structures and devices are shown in block diagram form in order to avoid obscuring the description. For example, the specification is described in some embodiments above with reference to user interfaces and particular hardware. However, the description applies to any type of computing device that can receive data and commands, and any peripheral devices providing services.

Reference in the specification to "some embodiments" or "an embodiment" means that a particular feature, structure, or characteristic described in connection with the embodiment is included in at least some instances of the description. The appearances of the phrase "in some embodiments" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of entirely hardware embodiments, entirely software embodiments, or embodiments containing both hardware and software elements. In some embodiments, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   determining, with one or more processors, a first habitual activity of a first user and a second habitual activity of a second user;
   identifying, with the one or more processors, a time period during which both the first user and the second user are available based on the first habitual activity and the second habitual activity;
   determining, with the one or more processors, a first context for the first habitual activity and a second context for the second habitual activity;
   determining, with the one or more processors, whether the first context is matching with the second context;
   responsive to determining that the first context is matching with the second context, determining, with the one or more processors, whether a likelihood of a social interaction between the first user and the second user satisfies a threshold probability for success;
   responsive to determining that the likelihood of the social interaction between the first user and the second user satisfies the threshold probability for success, generating, with the one or more processors, a suggestion identifying the second user available for the social interaction with the first user based on the time period;
   transmitting, with the one or more processors, instructions to a first client device of the first user that cause a display of the suggestion to the first user; and
   responsive to the first user ignoring the suggestion, modifying the threshold probability.

2. The computer-implemented method of claim 1, wherein determining the first habitual activity of the first user includes determining the first habitual activity of the first user based on the first client device associated with the first user.

3. The computer-implemented method of claim 1, further comprising identifying a time period during which both the first user and the second user are available based on the first habitual activity and the second habitual activity.

4. The computer-implemented method of claim 1, wherein the first habitual activity of the first user includes one from a group of the first user accessing applications for personal use and the first user accessing applications for business use.

5. The computer-implemented method of claim 1, wherein the social interaction includes one from a group of the first user engaging with a photo shared by the second user, the first user playing an online game with the second user, the first user joining a group that the second user belongs to and sharing a post from the second user with the first user.

6. The computer-implemented method of claim 1, wherein generating the suggestion identifying the second user available for the social interaction with the first user comprises:
   identifying a social group associated with the first context and the second context, the social group being created by the first user in a social network; and
   generating the suggestion that the first user add the second user to the social group.

7. The computer-implemented method of claim 1, wherein generating the suggestion identifying the second user available for the social interaction with the first user comprises:
   identifying a user preference of the first user; and
   generating the suggestion based on the user preference.

8. The computer-implemented method of claim 1, further comprising determining a type of relationship between the first user and the second user and generating the suggestion identifying the second user available for the social interaction with the first user based on the type of relationship.

9. The computer-implemented method of claim 3,
   wherein transmitting the instructions to the first client device of the first user that cause the display of the suggestion to the first user includes transmitting the instructions for displaying the suggestion in the time period.

10. The computer-implemented method of claim 1, further comprising determining the likelihood of social interaction based on location information, an electronic communication history, and a browsing history.

11. A system comprising:
    one or more processors; and
    a memory storing instructions that, when executed by the one or more processors cause the system to perform operations comprising:
       determining a first habitual activity of a first user and a second habitual activity of a second user;
       identifying a time period during which both the first user and the second user are available based on the first habitual activity and the second habitual activity;
       determining a first context for the first habitual activity and a second context for the second habitual activity;
       determining whether the first context is matching with the second context;
       responsive to determining that the first context is matching with the second context, determining whether a likelihood of a social interaction between the first user and the second user satisfies a threshold probability for success;
       responsive to determining that the likelihood of the social interaction between the first user and the second user satisfies the threshold probability for success, generating a suggestion identifying the second user available for the social interaction with the first user based on the time period;
       displaying the suggestion to the first user on a first client device of the first user; and
       responsive to the first user ignoring the suggestion, modifying the threshold probability.

12. The system of claim 11, wherein determining the first habitual activity of the first user includes determining the first habitual activity of the first user based on the first client device associated with the first user.

13. The system of claim 11, wherein the operations further comprise identifying a time period during which both the first user and the second user are available based on the first habitual activity and the second habitual activity.

14. The system of claim 11, wherein the first habitual activity of the first user includes one from a group of the first user accessing applications for personal use and the first user accessing applications for business use.

15. The system of claim 11, wherein the social interaction includes one from a group of the first user engaging with a photo shared by the second user, the first user playing an online game with the second user, the first user joining a group that the second user belongs to and sharing a post from the second user with the first user.

16. The system of claim 11, wherein generating the suggestion identifying the second user available for the social interaction with the first user comprises:
   identifying a social group associated with the first context and the second context, the social group being created by the first user in a social network; and
   generating the suggestion that the first user add the second user to the social group.

17. The system of claim 11, wherein generating the suggestion identifying the second user available for the social interaction with the first user comprises:
   identifying a user preference of the first user; and
   generating the suggestion based on the user preference.

18. The system of claim 11, wherein the operations further comprise determining a type of relationship between the first user and the second user and generating the suggestion identifying the second user available for the social interaction with the first user based on the type of relationship.

19. The system of claim 13, wherein
   displaying the suggestion to the first user includes displaying the suggestion in the time period.

20. A computer program product comprising a non-transitory computer readable medium including a computer readable program, wherein the computer readable program when executed on a computer causes the computer to perform operations comprising:
   determining a first habitual activity of a first user and a second habitual activity of a second user;
   identifying a time period during which both the first user and the second user are available based on the first habitual activity and the second habitual activity
   determining a first context for the first habitual activity and a second context for the second habitual activity;
   determining whether the first context is matching with the second context;
   responsive to determining that the first context is matching with the second context, determining whether a likelihood of a social interaction between the first user and the second user satisfies a threshold probability for success;
   responsive to determining that the likelihood of the social interaction between the first user and the second user satisfies the threshold probability for success, generating a suggestion identifying the second user available for the social interaction with the first user based on the time period;
   transmitting instructions to a first client device of the first user that cause a display of the suggestion to the first user; and
   responsive to the first user ignoring the suggestion, modifying the threshold probability.

* * * * *